United States Patent [19]

Davis

[11] Patent Number: 4,702,510
[45] Date of Patent: Oct. 27, 1987

[54] DEMOUNTABLE FLAT BED FOR A FIFTH WHEEL TRACTOR

[76] Inventor: Danny J. Davis, 5450 Johnson St., Merrillville, Ind. 46410

[21] Appl. No.: 17,243

[22] Filed: Feb. 20, 1987

[51] Int. Cl.⁴ .............................................. B62D 23/00
[52] U.S. Cl. ................................. 296/35.3; 280/423 R
[58] Field of Search ............................. 296/35.3, 35.1; 280/423 R, 433

[56] References Cited

U.S. PATENT DOCUMENTS

| | | | |
|---|---|---|---|
| 2,151,640 | 3/1939 | Menning | 296/35.3 |
| 3,117,804 | 1/1964 | Bistrom | 280/438 |
| 3,746,369 | 7/1973 | Neff et al. | 280/476 R |
| 3,950,011 | 4/1976 | Yamanaka | 280/432 |
| 4,000,924 | 1/1977 | Blasingame | 296/35.3 |
| 4,047,733 | 9/1977 | Parkes | 280/423 R |
| 4,050,707 | 9/1977 | Glumac | 280/43.23 |
| 4,475,740 | 10/1984 | Strick | 280/403 |
| 4,662,670 | 5/1987 | Kemmer | 296/35.3 |

Primary Examiner—Robert R. Song
Attorney, Agent, or Firm—Gifford, Groh, VanOphem, Sheridan, Sprinkle and Dolgorukov

[57] ABSTRACT

A flat bed is designed for demountable attachment to the fifth wheel assembly of a conventional tractor, without modification of the tractor. The flat bed includes framing members and internal support members sandwiched between a top and bottom plate which are all welded together. A centrally disposed kingpin lockingly engages the fifth wheel assembly of the tractor while chains connecting the bed frame to the chassis of the tractor stabilize the bed against the pivoting and rocking motion. Sockets disposed along the sides of the frame can receive side rail fences or tie down straps to secure the load on the bed.

14 Claims, 3 Drawing Figures

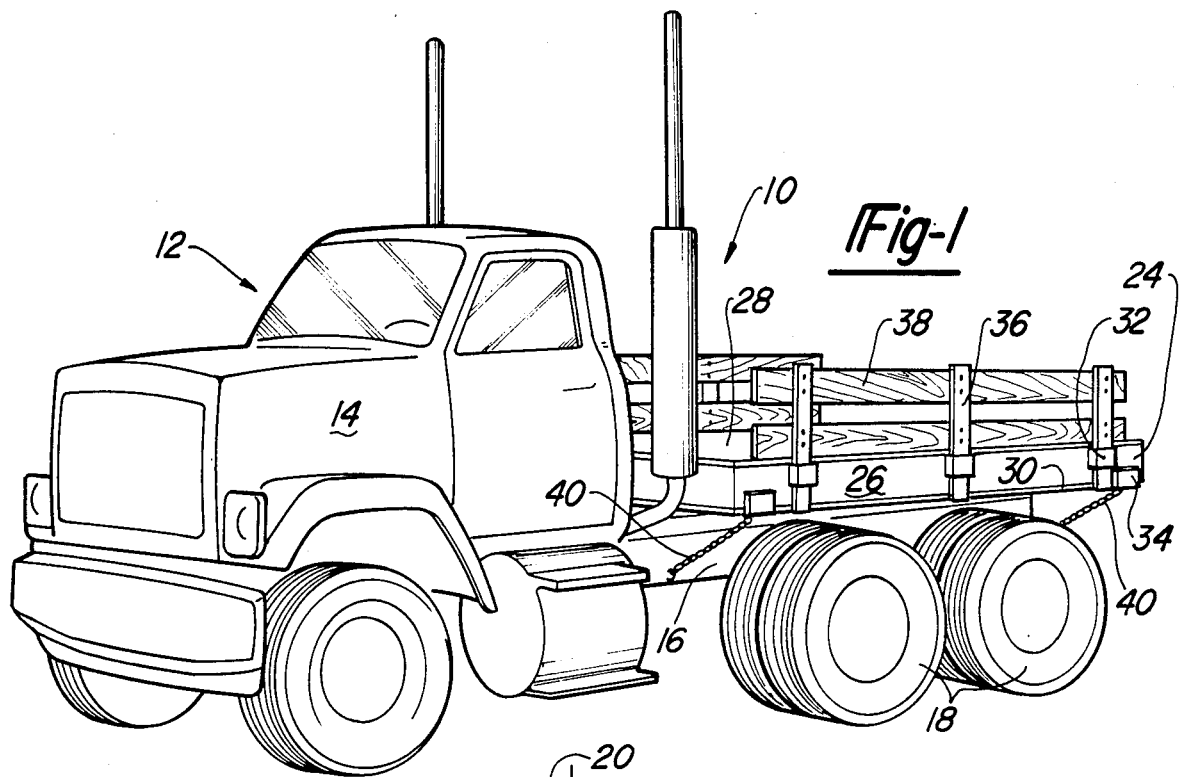
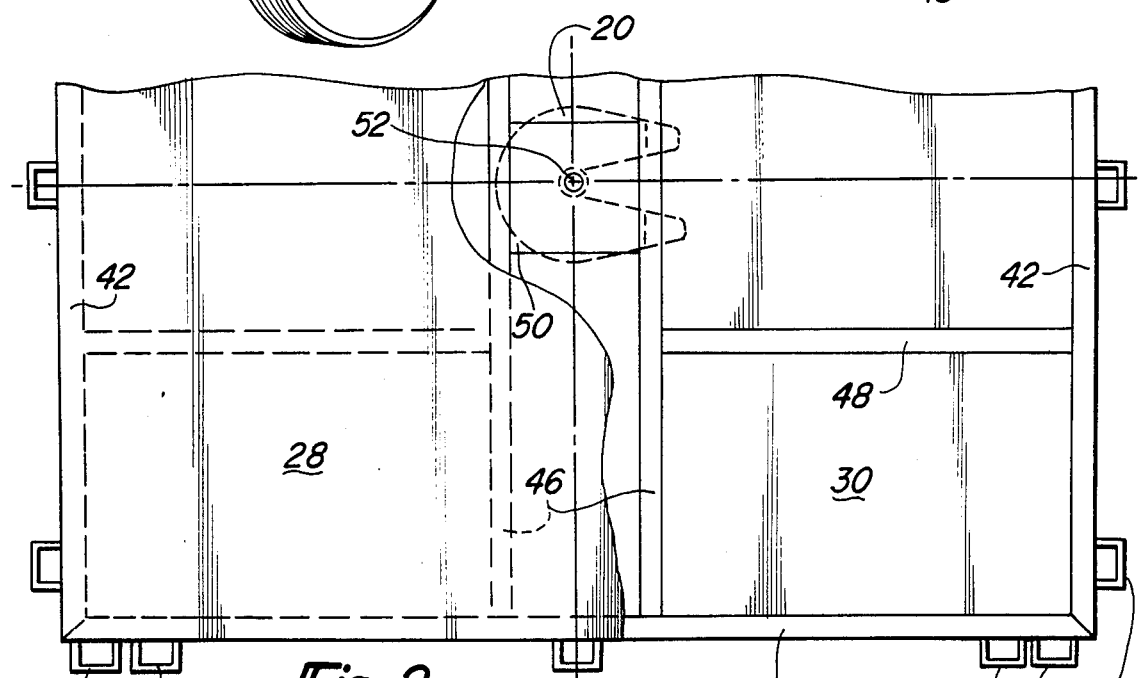
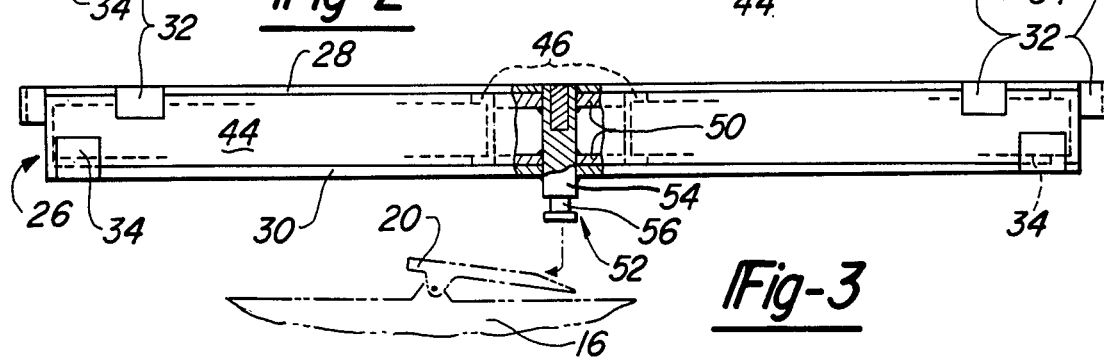

DEMOUNTABLE FLAT BED FOR A FIFTH WHEEL TRACTOR

BACKGROUND OF THE INVENTION

I. Field of the Invention

This invention relates to a flat bed for a fifth wheel tractor and, in particular, to a lightweight, demountable flat bed which quickly and easily converts a conventional fifth wheel diesel tractor to a flat bed truck.

II. Description of the Prior Art

Several attempts have been made to design a fifth wheel tractor which can be converted to a flat bed truck as required by the user. U.S. Pat. No. 3,117,804 to Bistrom discloses a tractor truck device with which includes an elevatable fifth wheel assembly which can be raised above the level of the truck bed. The fifth wheel assembly is attached to a lever arm which pivots upwardly when pushed by a V-shaped rocker arm. The rocker arm pivots about a point attached to the frame and is driven by an air cylinder. The rocker arm also cooperates with a ramp in such a way that, when the fifth wheel assembly is in a lowered position, the ramp is in a raised position to complete a flat bed. Conversely, when the fifth wheel assembly is elevated, the ramp is lowered to form a further guide for the kingpin. In either of the positions, the device includes pins which lock the components in their respective positions.

U.S. Pat. No. 4,475,740 to Strick discloses an articulated truck/trailer combination which includes a specially adapted fifth wheel tractor on which a flat bed or box housing can be placed, as well as a separate trailer designed to be towed in tandem behind the tractor/trailer combination. According to Strick, the tractor may also be used separately and has a fifth wheel assembly for cooperation with a conventional trailer. However, the tractor disclosed by Strick has several features with which significantly limit its utility. For example, a short cab tractor is required so that there is room between the back of the cab and the fifth wheel assembly to mount a flat bed or box like housing.

Moreover, the tractor is unconventional in that it has small diameter, i.e. fifteen inch, wheels so that the flat or box like housing rests at a conventional height of about 33 inches above the ground. Consequently, in order for the tractor to cooperate also with a standard trailer, it is necessary for the fifth wheel assembly to be elevated to its conventional height. For this purpose, Strick discloses a sliding lever arrangement which elevates the fifth wheel assembly to a conventional height.

Each of the previously known devices suffers from one or more of the following disadvantages; they are difficult to convert from use as a tractor/trailer combination to use as a truck; they require intricate mechanical linkages to raise and lower the fifth wheel assembly to a useful height; the linkages are heavy and expensive to manufacture and install, and are subject to periodic maintenance and/or failure; and the devices require specially adapted tractors and cannot be used with conventional fifth wheel tractors. These and other disadvantages are overcome by the present invention.

SUMMARY OF THE INVENTION

The present invention provides a flat bed for removable mounting on a fifth wheel diesel tractor to provide a small yet stable flat bed truck for hauling loads short distances. For example, a large manufacturer which utilizes conventional tractors and trailers for hauling supplies across the country may also desire to shuffle small loads from one location to another within a manufacturing compound. Previously, this would have required the use of additional flat bed trucks or trailers. According to the present invention, however, a flat bed can be mounted atop the existing fifth wheel tractors, utilizing its standard fifth wheel assembly and eliminating the necessity of a separate truck or trailer.

The flat bed basically comprises a rectangular frame having a top plate and a bottom plate. A kingpin extends through the bottom plate and is dimensioned to securely, yet removably, engage the fifth wheel assembly of a conventional tractor. Attaching lugs are disposed along the sides of the frame near each of the ends and a fastener such as a chain stabilizes the bed by connecting the attachment lugs to the chassis of the tractor. In addition, sockets may be disposed along the sides and ends of the frame for retaining the load on the bed. The sockets may receive the post of a fence rail or, alternatively, they can serve as points to which tie down straps are fastened to secure the load to the flat bed.

BRIEF DESCRIPTION OF THE DRAWINGS

The present invention can be more fully understood by reference to the following detailed description, when read in conjunction with the accompanying drawings in which like reference numerals refer to like parts throughout the several views, and in which:

FIG. 1 is a perspective view of the flat bed of the present invention mounted on a conventional fifth wheel tractor;

FIG. 2 is a partially fragmented top view of the flat bed; and

FIG. 3 is a partially fragmented side view of the invention.

DETAILED DESCRIPTION OF THE PREFERRED EMBODIMENT

Referring first to FIG. 1, the device 10 is thereshown mounted to a conventional fifth wheel diesel tractor 12. The fifth wheel diesel tractor 12 is conventional in every respect and can alternatively be used to pull semitrailers. The tractor 12 comprises a cab 14 mounted on a chassis 16 which is supported by wheels 18. A fifth wheel 20 (see FIGS. 2 and 3) is mounted to the chassis 16 behind the cab 14 and approximately over the rear wheels 18. The fifth wheel 20 is a standard version known in the art and may be mounted to the chassis 16 at chassis cross members (not shown).

The device 10 comprises a planar bed 24, including a perimetric frame 26 sandwiched between a top plate 28 and a bottom plate 30. To the outside of the frame 26 are attached a plurality of sockets 32 and attachment lugs 34. The sockets 32 and the attachment lugs 34 are preferably manufactured from U-shaped channel pieces which have their open side welded to the frame 26. Preferably, three such sockets 32 are welded to each side of the frame 26. They are conveniently spaced apart along each side and, ideally, are located near the top side of the frame 26 as shown in FIG. 3.

The sockets 32 are adapted to receive the posts 36 of a side rail fence 38 as shown in FIG. 1. The side rail fence 38 helps to retain a load on the bed 24. Alternatively, the sockets 32 can be used as tie down lugs to which can be fastened leather straps or chains to secure the load to the bed 24.

The attachment lugs 34 similarly comprise portions of U-shaped channel member having their open side welded to the frame 26. Preferably, two attachment lugs 34 are attached to each lateral side of the frame 26, one near each end. In contrast to the sockets 32, the attachment lugs 34 ideally are located toward the bottom edge of the sides of frame 26, as shown in FIG. 3.

Chains 40 stabilizes the bed 24 on the tractor 12 by having one end attached to the bed 24 at the attachment lugs 34, and another end attached to the chassis 16. The chains 40 may be attached at the respective ends by hooks or operable links (not shown) and may include a tightening winch if desired. Thus, the chains 40 serve as a quick and convenient means for stabilizing the bed 24 against rocking and pivoting motion on the tractor 12.

Referring now to FIGS. 2 and 3, the bed 24 is thereshown in greater detail. In FIG. 2, the frame 26 is shown in comprise a pair of end frame members 42 and a pair of side frame members 44 (only one shown), arranged to form a rectangle. Ideally, the end frame members 42 are about 7 feet long and the side frame members 44 are about 8 feet long, although other convenient dimensions are within the scope of the invention. In addition, two lateral supports 46 extend from one side frame member 44 to the other in a central region of the bed 24. Preferably two longitudinal supports 48 extend from each lateral support 46 to each end frame member 42 making four total longitudinal support members 48 (only two shown).

Still referring to FIGS. 2 and 3, it can be seen that the end frame members 42 and the side frame members 44 comprise U-shaped channel members having their side walls welded to the top plate 28 and the bottom plate 30, while their bottom walls from the sides of the frame 26. The lateral supports 46 similarly comprise channel members with their side walls welded to the top and bottom plates 28, 30 and their ends welded to the side frame members 44. The longitudinal supports 48 may comprise channel members or I beam members with their ends welded to end frame member 42 and lateral supports 46.

Each of the frame members 42, 44 and the support 46, 48 preferably is constructed of steel and fastened together by welding or similar means. The top plate 28 and bottom plate 30 are formed from ½ inch plate steel or similar material. They are attached to the frame 26 with fasteners, spots welds or the like.

In the central region of the bed 24, the top plate 28 and the bottom plate 30 have thickened reinforced plates 50 for supporting the kingpin 52. In the preferred embodiment, the reinforced plates 50 comprise 2 inch thick steel plates covering a square area about 12"×12" in the center of bed 24 and spanning the distance between the lateral supports 46. They are welded to the respective top and bottom plates 28, 30 and to the supports 46.

The kingpin 52 comprises a cylindrical body 54 mounted to the top reinforcing plate 50 and extending through the bottom reinforced plate 50 and the bottom plate 30 to depend from the lower surface of the bottom plate 30. A reduced diameter portion 56 is disposed near the end of the cylindrical body 54 and provides a surface which the locking jaw (not shown) of the fifth wheel 20 can securely engage in a manner well known in the art.

Having thus described the structural features of the flat bed of the present invention, its many advantages and its operation are readily apparent. The bed 24 enables a diesel tractor 12 to be converted quickly and easily from a semi-trailer hauler to a flat bed truck capable of hauling smaller, yet still heavy, loads. The entire bed 24 weighs only approximately 3000 pounds and can easily be placed into position with its kingpin 52 engaged in the fifth wheel 20 of the tractor 12 by means of a forklift or small crane. Conversion requires neither time consuming adjustment of the height of the fifth wheel assembly 20, no operation of intricate mechanical linkages to mount the bed 24 to the chassis 16. Once the kingpin 52 is engaged in the fifth wheel 20, chains or fasteners 40 are attached to each of the four corners of the bed 24 at the attachment lugs 34 and are attached and tensioned to the chassis 16 to stabilize the bed 24 against rocking or pivoting motion about the kingpin 52.

The device 10 of the present invention is cost effective because it serves as an inexpensive replacement for complete flat bed trucks which would otherwise be required for hauling small, yet heavy, loads.

The foregoing detailed description has been given for clearness of understanding and no unnecessary limitations should be understood therefrom. It will be obvious to those skilled in the art that many modifications can be made without deviation from the spirit of the invention as defined by the scope of the appended claims.

I claim:

1. A demountable flat bed for use with a conventional tractor having a chassis and a standard fifth wheel assembly mounted on the chassis, said flat bed comprising:
   a substantially planar, rectangular bed having a pair of sides, a pair of ends, an upper surface and a lower surface;
   a kingpin disposed in a central region of said lower surface and depending therefrom, said kingpin having a reduced diameter portion for demountable engagement with the fifth wheel assembly; and
   means for securing said bed to the chassis against rocking and pivoting motion, said means for securing comprising at least four attachment points, two associated with each side of the bed, one near each end and fastening means extending from each attachment point to the chassis.

2. The flat bed as defined in claim 1 wherein said attachment points comprise channel members secured to the sides of said bed, along an outer periphery of said bed.

3. The flat bed as defined in claim 1 and comprising means for retaining in place a load placed on said flat bed.

4. The flat bed as defined in claim 3 wherein said means for retaining comprises a plurality of sockets attached to the sides of said bed, said sockets being dimensioned to receive posts of a side rail fence.

5. The flat bed as defined in claim 3 wherein said means for retaining comprises a plurality of tie down lugs disposed along each side and tie fasteners having an end secured to at least one of the tie down lugs on the sides of the bed and being tensioned over said load.

6. The flat bed as defined in claim 1 wherein said rectangular flat bed comprises a perimetric frame, said upper surface comprises a top plate, and said lower surface comprises a bottom plate, said top and bottom plates being separated by said frame.

7. The flat bed as defined in claim 6 wherein said rectangular flat bed further comprises at least one lateral support extending between the sides of said bed and attached to said perimetric frame.

8. The flat bed defined in claim 7 wherein said rectangular flat bed further comprises at least one longitudinal support extending between said at least one lateral support and each of the ends.

9. The flat bed as defined in claim 7 wherein said frame comprises channel members arranged so that sidewalls of said channel members are welded to said top and bottom plates and a bottom wall of said channel forms the sides and ends of said bed.

10. The flat bed as defined in claim 9 wherein said flat bed comprises two lateral supports and four longitudinal supports, and wherein said lateral supports comprise channel members and said longitudinal supports comprise I-beam members.

11. The flat bed as defined in claim 10 wherein ends of said lateral supports are welded to the side channel members of said perimetric frame and respective ends of said longitudinal supports are welded to said lateral supports and the end channel members of said perimetric frame.

12. The flat bed as defined in claim 10 and comprising a thickened reinforcing plate disposed adjacent each of said top and bottom plates in a central region between said two lateral supports for supporting said kingpin.

13. The flat bed as defined in claim 12 wherein said kingpin extends from said top plate through said bottom plate to depend therefrom.

14. In combination:
- a conventional tractor having a chassis, and a standard fifth wheel assembly;
- a substantially planar, rectangular bed having a pair of sides, a pair of ends, an upper surface and a lower surface;
- a kingpin disposed in a central region of said reduced diameter portion for demountable engagement with said fifth wheel assembly; and
- means for securing said bed to said chassis against rocking and pivoting motion, said means for securing comprising at least four attachment points, two associated with each side of the bed, one near each end, and fastening means extending from each attachment point to said chassis.

* * * * *